March 15, 1932. K. KLINGER 1,849,580
STOP COCK WITH A PACKING SLEEVE SURROUNDING THE PLUG OF THE COCK Filed May 25, 1931

Inventor
Karl Klinger
By Sommers & Young
Attys

Patented Mar. 15, 1932

1,849,580

UNITED STATES PATENT OFFICE

KARL KLINGER, OF GUMPOLDSKIRCHEN, AUSTRIA, ASSIGNOR TO N. V. IRMA INDUSTRIE EN RUWMATERIALEN MAATSCHAPPIJ, OF ROTTERDAM, NETHERLANDS

STOP COCK WITH A PACKING SLEEVE SURROUNDING THE PLUG OF THE COCK

Application filed May 25, 1931, Serial No. 539,901, and in Germany June 3, 1930.

This invention relates to a stop cock with a packing sleeve of solid, but elastic material surrounding the plug of the cock, and in which the openings in said sleeve, for the passage of fluid therethrough are furnished with inserted metallic bushes shaped to the inner and outer curvatures of the sleeve. If these inserted bushes, each of which has a cylindrical hole in it, be turned cylindrically on their outer edges, as is the case in known constructions, the packing material, when tightened up, does not readily adapt itself to the inserted bush. Furthermore, the bushes of the known type referred to have a cross-section ill-adapted to withstand the pressure applied to the packing and are, therefore, easily compressed. Finally, means have to be provided especially for the purpose of preventing rotation of the bush in the packing sleeve and for preventing metallic contact between the bushes and the plug of the cock.

According to the present invention, therefore, it is proposed that the inserted bush or bushes shall run convergently from the outer to the inner surface of the packing sleeve, at least in the vicinity of the outer boundary lines lying transverse to the axis of the sleeve. For practical reasons the preferred construction is one in which the outer boundary surfaces of the inserted bush form parts of the surfaces of cones. With this construction, there is obtained an increase of cross section on the principal axis of the bush, which lies in the plane of the axis of the sleeve, whereby the moment of resistance to pressure applied to the packing is increased. There is also obtained in the minor axis of the bush, which axis runs at right angles to the axis of the sleeve a cross section which enables the length of packing between two bushes to be increased and, consequently, cock plugs of smaller diameter for the same sized opening for the passage of fluid can be used.

Finally, the cross section of the bushes obtained in this way ensures better contact between the packing composition and the bushes and also results in the bushes being always forced outwards in the packing sleeve and so prevented from coming into contact with the plug of the cock.

In order to obtain a greater length of packing it has already been proposed to provide ribs with converging edges in the plug receiving bore of the housing. In these known constructions, however, it is only possible to use a plastic packing material, which can be pressed in between the ribs on the shell or casing of the cock. The known constructions also afford a considerable reduction of the cross-sectional area of flow in the space bounded by the ribs, if cock plugs of small diameter are to be employed. Finally, renewal of the packing material, which is easily effected in a cock according to the present invention, is a matter of considerable difficulty with the known constructions.

A constructional example of the subject matter of the present invention is shown in the accompanying drawings, in which Fig. 1 is a view in longitudinal section of a stop cock packing sleeve according to the present invention.

The packing sleeve $a$ may be formed, in the well known way, of graphite and asbestos and may conveniently be built up of separate thin sheets or plates, stuck together. At the points in the bore of the cock where the fluid passes through this sleeve has openings for the reception of metal bushes $b$. In these bushes there is generally a cylindrical hole $c$ which corresponds approximately to the diameter of the bore through the plug of the cock.

The plug is pushed into the sleeve $a$ and the sleeve itself is introduced into the bore of the casing of the cock, wherein it is compressed by means of a screwed down gland or equivalent means.

The external surfaces of the bushes $b$ are turned to a conical shape in the constructional example shown, the particular cone angle used depending on the nature of the material selected.

Figure 1:
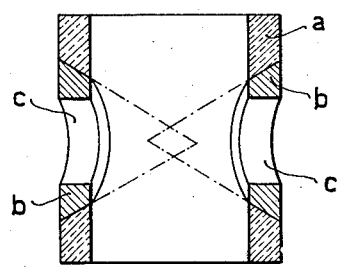
Figure 2:
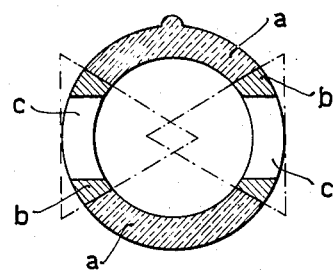
Fig. 2 is a cross sectional view of the sleeve shown in Fig. 1.
Figure 3:
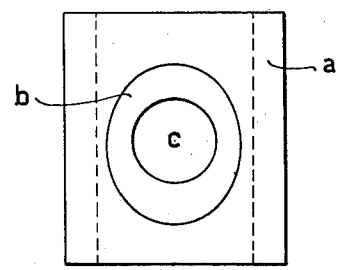
Fig. 3 shows the same sleeve in side elevation.

As the inner and outer boundary surfaces of the bushes $b$, as shown in Fig. 2, must fit the outer and inner periphery of the sleeve $a$, the inserted body is given the oval form shown in Fig. 3 by being turned conical. This form imparts to the inserted body a high moment of resistance to withstand packing pressure applied to the sleeve $a$ from the top downwards, assuming the sleeve to be in the position shown in Figs. 1 and 3.

Owing to the bevelling of the bushes the packing material can easily ride over the inserted body under the action of the applied pressure and under these circumstances, the bushes $b$ are forced outwards and caused to bear firmly against the bore of the cock shell. At the same time the packing material is forced inwards and bears firmly against the outer wall of the plug.

What I claim is:—

1. Stop cock with a packing sleeve surrounding the cock plug and, inserted in the openings in said sleeve through which the fluid passes, metal bushes conformed to the outer and inner curvatures of the sleeve, characterized by the fact that the bushes run convergently from the outer to the inner surface of the sleeve at least on the vicinity of the outer boundary lines lying transverse to the axis of the sleeve.

2. Stop cock according to claim 1, characterised by the fact that the outer boundary surfaces of the bushes form parts of the surfaces of cones.

In testimony that I claim the foregoing as my invention, I have signed my name.

KARL KLINGER.